(12) United States Patent
Woo

(10) Patent No.: US 12,238,227 B2
(45) Date of Patent: Feb. 25, 2025

(54) DEVICE, SYSTEM AND METHOD FOR PROVIDING INFORMATION SECURITY

(71) Applicant: QUANTUMCIEL PTE. LTD., Singapore (SG)

(72) Inventor: Kang Wei Woo, Singapore (SG)

(73) Assignee: QUANTUMCIEL PTE. LTD., Singapore (SG)

(*) Notice: Subject to any disclaimer, the term of this patent is extended or adjusted under 35 U.S.C. 154(b) by 285 days.

(21) Appl. No.: 17/637,282

(22) PCT Filed: Aug. 22, 2019

(86) PCT No.: PCT/SG2019/050414
§ 371 (c)(1),
(2) Date: Feb. 22, 2022

(87) PCT Pub. No.: WO2021/034264
PCT Pub. Date: Feb. 25, 2021

(65) Prior Publication Data
US 2022/0286303 A1     Sep. 8, 2022

(51) Int. Cl.
| H04L 9/32 | (2006.01) |
| G11C 13/00 | (2006.01) |
| H04L 9/00 | (2022.01) |
| H04L 9/08 | (2006.01) |
| H04L 9/14 | (2006.01) |

(52) U.S. Cl.
CPC ........ *H04L 9/3278* (2013.01); *G11C 13/0059* (2013.01); *H04L 9/0861* (2013.01); *H04L 9/14* (2013.01); *H04L 9/50* (2022.05)

(58) Field of Classification Search
None
See application file for complete search history.

(56) References Cited

U.S. PATENT DOCUMENTS

| 10,320,569 | B1 | 6/2019 | Wentz et al. |
| 10,742,421 | B1* | 8/2020 | Wentz ................. H04L 9/0897 |
| 2016/0125288 | A1* | 5/2016 | Pileggi ................. G06N 3/049 |
| | | | 706/29 |
| 2018/0076957 | A1 | 3/2018 | Watanabe et al. |
| 2018/0234413 | A1* | 8/2018 | Watanabe ............ H04L 9/0869 |

(Continued)

FOREIGN PATENT DOCUMENTS

| CN | 109325331 A | 2/2019 |
| EP | 3340212 A1 | 6/2018 |
| WO | 2019157810 A1 | 8/2019 |

OTHER PUBLICATIONS

International Search Report and Written Opinion of International Searching Authority of International Application No. PCT/SG2019/050414.

(Continued)

*Primary Examiner* — Philip J Chea
*Assistant Examiner* — James Ross Hollister
(74) *Attorney, Agent, or Firm* — JCIP; Joseph G. Chu

(57) ABSTRACT

A cryptography system comprising a first node having a unique identifier generator configured to generate at least one physical unclonable function (PUF); and a second node configured to remotely send an attestation request to the first node is disclosed. In some embodiments, the cryptography system may form at least part of a distributed ledger and the PUF is configured to respond to the attestation request.

3 Claims, 8 Drawing Sheets

(56) References Cited

U.S. PATENT DOCUMENTS

| | | | |
|---|---|---|---|
| 2018/0309570 A1 | 10/2018 | Amini et al. | |
| 2018/0321942 A1* | 11/2018 | Yu | G06F 7/00 |
| 2019/0044740 A1 | 2/2019 | Smith et al. | |
| 2020/0374132 A1* | 11/2020 | Lobban | G06Q 10/00 |
| 2021/0192059 A1* | 6/2021 | Watanabe | H04L 9/0861 |
| 2021/0218720 A1* | 7/2021 | Oberhauser | H04L 9/3239 |

OTHER PUBLICATIONS

Yang-Scharlotta J. et al., Reliability Characterization of a Commercial TaOX-based ReRAM. 2014 IEEE International Integrated Reliability Workshop Final Report (IIRW), Oct. 16, 2014, pp. 131-134 [Retrieved on Nov. 5, 2021] <DOI: 10.1109/IIRW.2014.7049528>.

Extended European Search Report dated Mar. 15, 2023 for European Application No. 19942480.5.

Ito Satoru et al: "ReRAM Technologies for Embedded Memory and Further Applications", 2018 IEEE International Memory Workshop (IMW), IEEE, May 13, 2018 (May 13, 2018), pp. 1-4, XP033362674, DOI: 10.1109/IMW.2018.8388846 [retrieved on Jun. 19, 2018] * the whole document*.

* cited by examiner

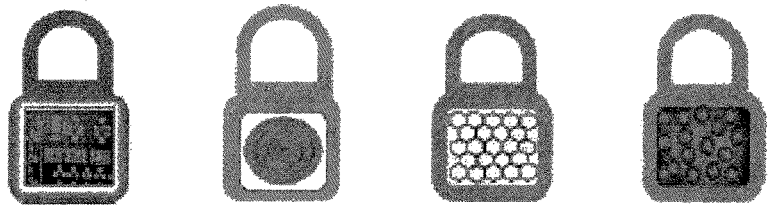

| Properties | Silicon PUF | Optical PUF | Nanotech PUF | Biological PUF |
|---|---|---|---|---|
| Entropy | Low | Medium | High | High |
| Reproducibility | Yes | Yes | Yes | Yes |
| Reconfigurability | No | Yes | Limited | Yes |
| Uniqueness | Yes | Yes | Yes | Yes |
| CRPs | Linear | Exponential | Linear | Exponential |
| Cost | High | High | High | Low |
| Energy Consumption | High | Low | Low | Low |
| Reverse Engineering | Possible | Very Difficult | Difficult | Very Difficult |
| Volatility | Volatile | Non-volatile | Non-Volatile | Non-volatile |
| PUF | Weak | Strong | Strong | Strong |

Figure. 6

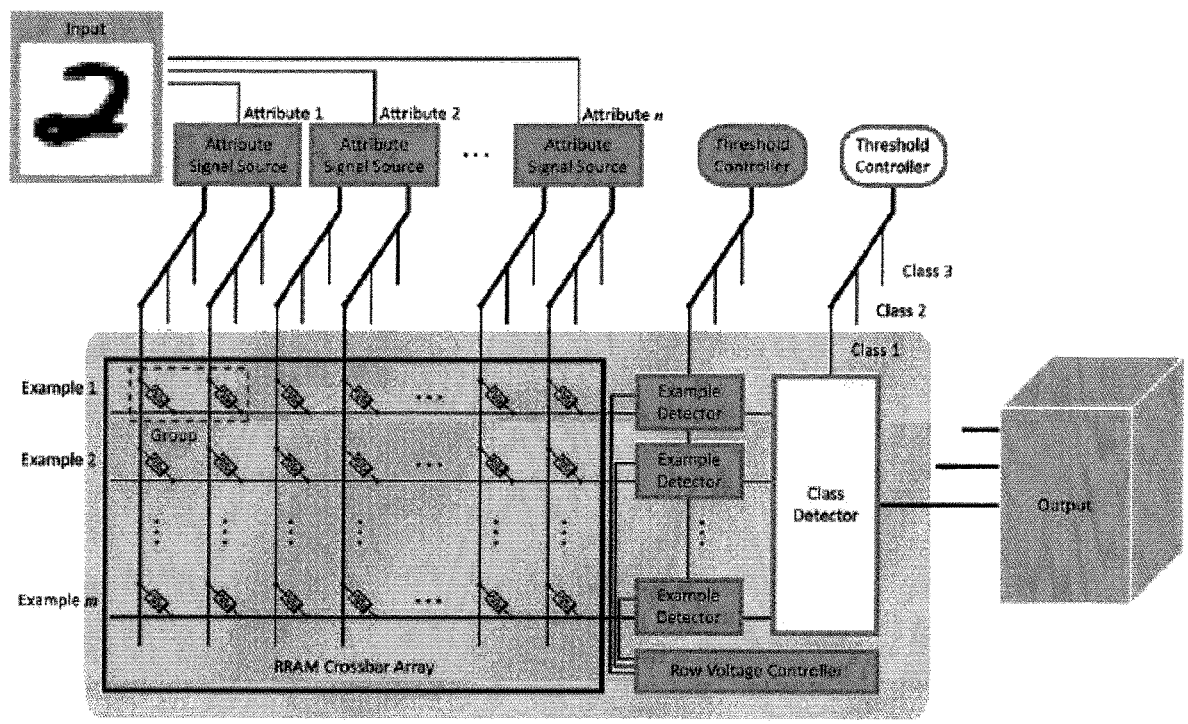
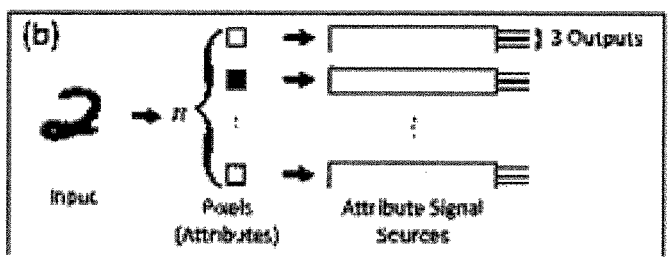
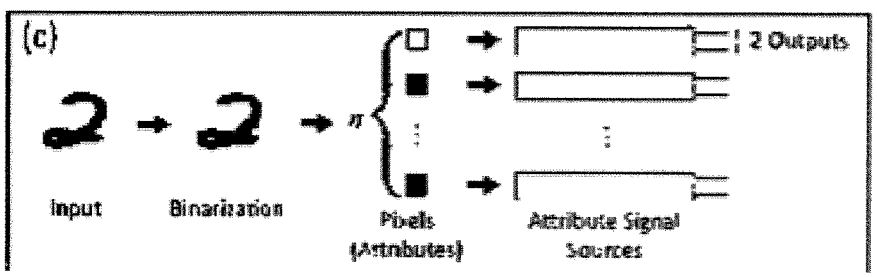
Figure. 8

DEVICE, SYSTEM AND METHOD FOR PROVIDING INFORMATION SECURITY

FIELD

The present disclosure relates to a device, system and method for providing information security, such as, but not limited to, cyber security and/or network security.

BACKGROUND

The following discussion of the background to the disclosure is intended to facilitate an understanding of the present disclosure only. It should be appreciated that the discussion is not an acknowledgement or admission that any of the material referred to was published, known or part of the common general knowledge of the person skilled in the art in any jurisdiction as at the priority date of the disclosure.

With the advent of internet connectivity and sensor technology brought about by Internet of Things (IoT), there exists a need for better cyber security and network access management, in part to mitigate against cyberattacks.

Cryptography is a known method deployed in networks for the enhancement of security. An existing cryptography method is the use and adoption of hash function(s). Commonly deployed in distributed ledger technology (DLT) such as blockchain, a hash function comprises one or more mathematical algorithms operable to map or correlate data of any size to a pre-determined or pre-fixed size known as a hash value. A hash function may be applied as a digital signature and/or digital fingerprint for authentication controls.

However, existing cryptography devices and methods may be limited in applications. In addition, they may not be ready or compliant with ongoing developments in technology.

There exists a need for improved cryptography devices, systems and methods for enhancing network security.

SUMMARY

The disclosure provides a device, system, and/or method capable of providing a self-sovereign, self-testing, and self-sufficient security system based on cryptography. The disclosure provides a key generator configured to generate one or more physical unclonable functions (PUF), and can be deployed on a distributed ledger environment such as a blockchain. In some embodiments, the distributed ledger environment may include an internet-of-things (IoT) network which includes a plurality of network nodes having a first and a second network nodes.

In some embodiments, when a node (e.g. a first node) intends to join an existing network, a node within the existing network (e.g. a second node) functions as a remote verifier. A public-private key pair may be generated for the first node, wherein the private key is generated for the first node via the at least one PUF, and the public key is registered with the distributed ledger.

In some embodiments, the public key is encrypted before registration with the distributed ledger. The security of the first node is verified through the remote attestation of the public key on the distributed ledger.

In the disclosed system, the cryptography is post quantum ready. A cryptographic system may be regarded as post-quantum (PQ) ready if it is resistant to quantum cryptanalytic methods, e.g. using the Shor algorithm (quantum factoring) or the Grover algorithm (quantum search), in conjunction with a powerful quantum computer. Such PQ-ready algorithms are classical algorithms (i.e. they operate on a non-quantum computer). Examples of suitable PQ ready cryptography that may be implemented in the system includes one or more of the following:—Hash-based cryptography; Lattice-based cryptography; Code-based cryptography; Super-singular isogeny elliptic curve cryptography; Multivariate cryptography.

Other systems, e.g. natural occurring or synthetic diamond PUF, may be used to access quantum algorithms to conduct quantum cryptography and as a basis for quantum computing. For use cases, synthetic diamonds may be used where it is possible to control over crystal defects and better cost effectiveness. In contrast, natural occurring diamonds may be used to have the device identify the (rare and sometimes named) diamonds among counterfeits.

Other aspects and features will become apparent to those of ordinary skill in the art upon review of the following description of specific embodiments in conjunction with the accompanying figures.

BRIEF DESCRIPTION OF THE DRAWINGS

In the figures, which illustrate, by way of example only, embodiments of the present disclosure.

FIG. 6: is a table illustrating different properties of materials suitable for being used as PUFs;

FIG. 8: illustrates a neural network for the recognition of handwritten numbers (digits), trained on the MNIST dataset.

DETAILED DESCRIPTION

Throughout this document, unless otherwise indicated to the contrary, the terms "comprising", "consisting of", "having" and the like, are to be construed as non-exhaustive, or in other words, as meaning "including, but not limited to".

Furthermore, throughout the specification, unless the context requires otherwise, the word "include" or variations such as "includes" or "including" will be understood to imply the inclusion of a stated integer or group of integers but not the exclusion of any other integer or group of integers.

Throughout the description, the term 'cryptography' refers broadly to various methods, including but not limited to, encryption, signature, hash function, random number generation, key exchange, etc.

Throughout the description, the term 'hash function' is understood to include the secure hash algorithm family of standards which are based on the sponge construction for providing flexibility.

Throughout the description, the term 'node(s)' refers broadly to computer devices capable of performing computations, devices capable of being accessed by computer devices, or devices/objects capable of transmitting data to computer devices. A computer device may include a server, a laptop computer, a portable or hand-held computer such as a tablet PC or a smart-phone.

Throughout the description, the term 'network' includes communication network, such as, but not limited to, wired and wireless networks, fiber-based, free-space and quantum network.

Figure 1:
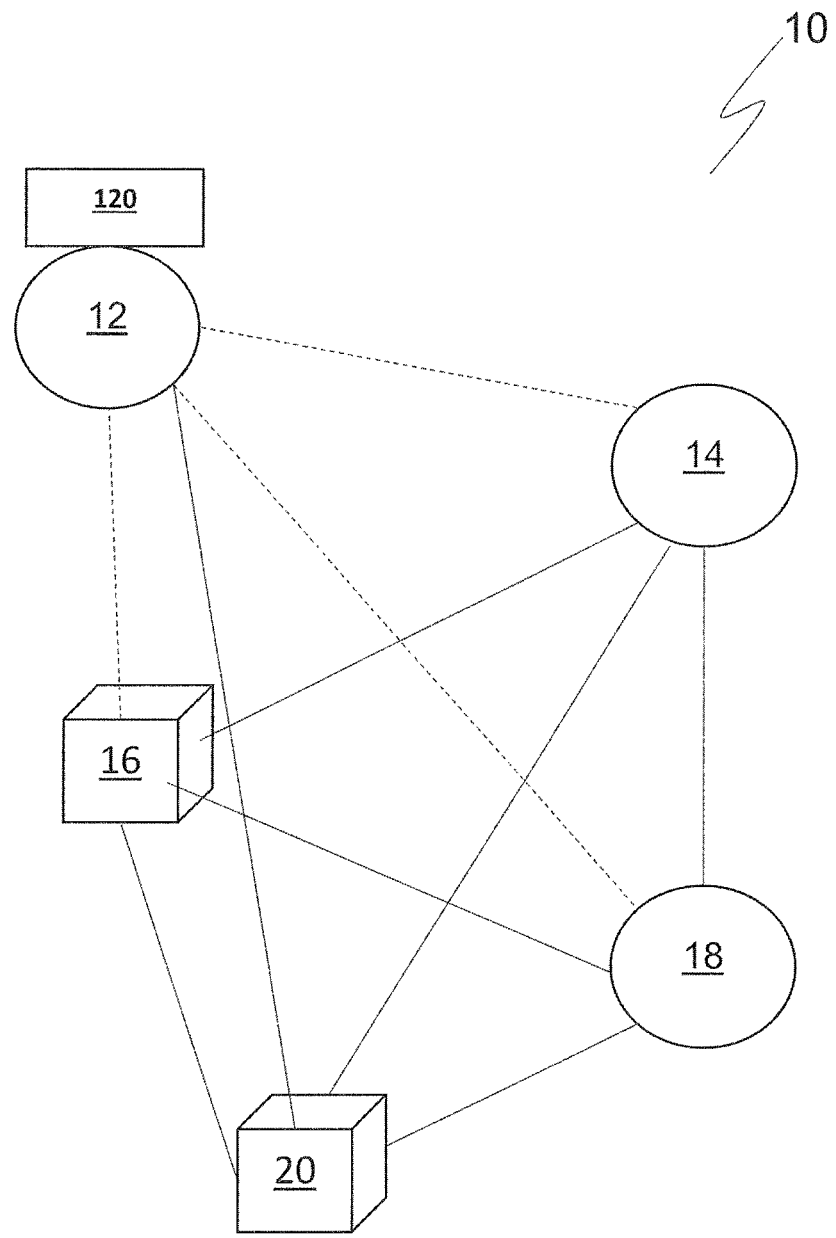
FIG. 1: illustrates a network or cryptography system in accordance with some embodiments.

FIG. 1 shows a network 10 comprising a plurality of nodes, such as a first node 12 and a second node 14. The terms 'first' and 'second' are introduced for clarity to differentiate the first node 12 and the second node 14, and it is to be appreciated that these terms do not indicate precedence or importance of one node over another.

The network 10 may be a secured network. The secured network may be a public network or a private network. The network 10 may also comprise distributed and non-distributed sub-systems. In some embodiments, the network 10 may include a distributed ledger system 16, such as a blockchain. The blockchain may include a centralized or decentralized network architecture. The blockchain may be an open blockchain or a proprietary blockchain.

In some embodiments, the network 10 may include an artificial intelligence (AI) system 18. The AI system 18 comprises one or more AI engines operable to provide security support to the overall network 10. In some embodiments the AI system 18 may be configured as a removal tool, the AI based removal tool operable to remove the first node 12 if the first node 12 fails a security test sent remotely by a verifier node. The security test may be in the form of an attestation request.

In some embodiments, the network 10 may further include an IoT system 20 for transmitting and receiving data from one or more sensors.

It is appreciable that in various alternative embodiments, the network 10 may instead form part of the distributed ledger system 16, the AI system 18, and the IoT system 20.

The first node 12 may include a key generator 120 configured to generate at least one physical unclonable function (PUF). Embodiments of the PUF may include electronic chips and/or naturally occurring objects such as diamonds, or biological DNA embossed with data capable of being accessed or read by a computer device which functions as a security device. The security device may include a controller having input/output interface. Such data may include a machine-readable code. An example of such a biological DNA embosses with the machine-readable code may be a crab shell embossed with a quick response (QR) code. Other examples of machine-readable code may include barcodes, matrix barcodes etc.

Once the PUF is generated, it may be interrogated using a challenge-response authentication protocol. A PUF preferably exhibits as many of the following properties as possible.

(a.) Reproducible (only by itself), a highly reproducible response to the same input challenge indicates determinism and low system noise;

(b) Unique—Different PUF designs should be unique, such that the same challenge given to two different devices produces vastly different responses;

(c) Unclonable—The PUF should be unclonable such that it is infeasible for an adversary with complete knowledge of a legitimate device's design to produce a copy that behaves identically to an authentic device;

(d) One-way—The underlying PUF operation itself should be sufficiently complex such that it is infeasible to invert its behavior;

(e) Unpredictable—Infeasible to predict a response to some arbitrary input; and (f) Tamper evident—If an adversary tampers with a legitimate PUF, it should be evident through inspection or interrogation.

In the selection of a suitable PUF, it is to be appreciated that the duality between signal and noise may be considered. A predominantly high noise state serves as a good random number generator for cryptographic use. A predominantly low noise (high signal) state serves as a good communicator. FIG. 6 is a table showing the various possibilities of PUF. As shown, the PUF may be broadly classified as silicon-based PUF (Si PUF), optical PUF, nanotech PUF, and biological PUF.

Different PUF materials may be utilized for the reason that they are capable of interfacing with a security device having a controller to generate and/or interact with the PUF material and access the PUF information.

In some embodiments, memory units, such as static random-access memory (SRAM) or dynamic random-access memory (DRAM) may be used as the PUF materials.

In some embodiments, the PUF may include one or more field-programmable gate array (FGPA) capable of being configured to generate one or more PUF.

In some embodiments, nanotechnology-based material(s) may be used as PUF materials. In particular, a memristor or resistive RAM (ReRAM) may be suitable as it is relatively more energy and space efficient than other types of PUF. In addition, the ReRAM may be implemented as part of a neuromorphic computing platform suitable for implementing one or more artificial intelligence-based applications, as the neuromorphic computing platform can also fulfil a dual role as the AI platform 18.

The memristor advantageously provides both computational and memory functions on the same device. The ReRAM may be arranged in the form of a crossbar array format, the ReRAM arranged to perform the function of one or more synapses, the same analogous to biological synapses and serves as a memory unit.

In various embodiments, the array of memristors may be implemented as ferroelectric RAM (FeRAM), magnetic RAM (MRAM), phase change memory (PCM) or other arrangements. They have different desirable characteristics, suitable for neuromorphic computing.

To implement self-sufficiency, neuromorphic computing may be a preferred choice as it supports artificial intelligence implementation, i.e. with or without extensive neural network training. Thus, system autonomy may be maintained even in the absence of network connectivity. The present system provides a scalable platform for neuromorphic computing. Deep learning can be subsumed under this framework.

In some embodiments, diamonds may be used as an optical-based PUF. The nitrogen-vacancy (NV) defect in diamond is well-studied among the colour centers. The NV center has found application in diamond-based single photon sources and detectors, diamond-based quantum communication and to some extent, quantum computing. There is fidelity, owing to the long coherence time. Moreover, the spin state of NV defects may be efficiently be accessed by a controller, i.e. read out (Read) and coupled to photons through spin-dependent transitions. There is also coherent manipulation and laser writing (Write) of NV centers. These properties may be utilized when diamond is used as a PUF or used to generate a PUF.

In addition to or as alternatives to diamonds, other solid-state materials, such as silicon carbide and boron nitride, may be used.

Advantageously, diamond-based systems can operate at room temperature, rather than in an ultra-low temperature environment, and is useful for quantum cryptography and quantum computing and is relatively energy efficient. With precision laser writing, an encrypted code may be marked on the diamond directly as one or more new NV centers. This is similar to the use of quick response (QR) code for a crab shell example use case. Once laser-marked, any attempt to tamper with the mark may be evident against the immutable record in the network 10 (when implemented as a blockchain or as part of a blockchain).

In some embodiments involving biological based PUF, it is possible for the first node to interact with an encrypted QR Code.

Figure 3:
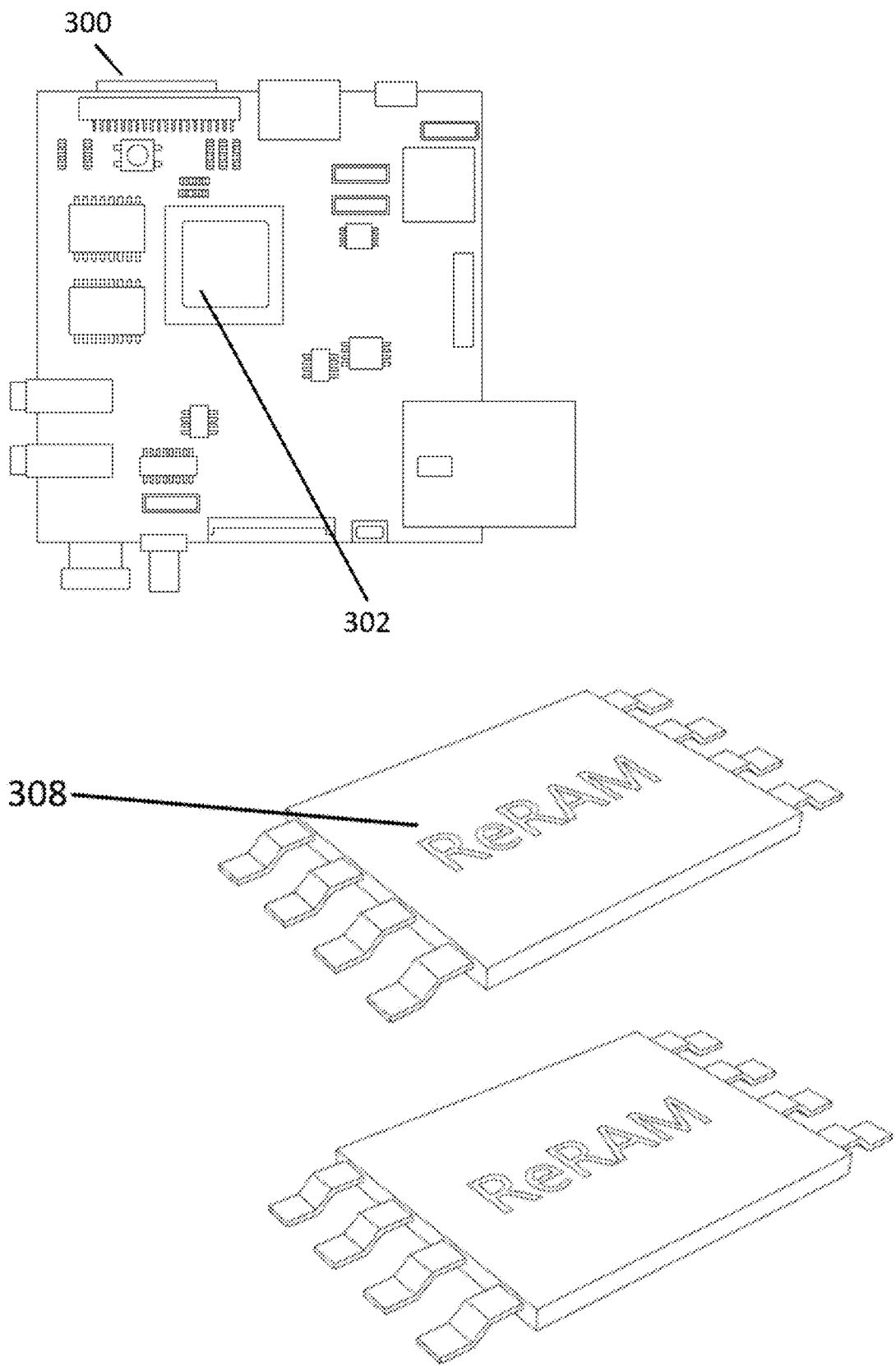
FIG. 3: shows a controller suitable for being used as part of a network node in the provision of security to a network.

As an exemplary embodiment, the key generator 120 may include a neuromorphic computing platform 700. The neuromorphic computing platform 700 includes an array of resistive random-access memory (ReRAM), wherein the array of ReRAM can be arranged in a crossbar array format. The key generator 120 may include at least one of a silicon-based PUF, an electronic PUF, an optical PUF, and a biological PUF. FIG. 3 shows a controller 300 suitable for being used as part of a network node, or as the network node, in the provision of security to the network 10. It is to be appreciated that any combinations of software and hardware, including a microkernel which is secured and resistant to virus, hacking, malware etc. may be suitable to form part of the controller. In one specific embodiment, the controller 300 includes a microkernel 302, such as, but not limited to, a seL4 microkernel on a processor board, such as a Sabre Lite™ chipset board. Other types of microkernel may be suitable in so far as the microkernel is rigorously verified by formal methods, such as mathematically proven to be correct.

In some embodiments, the ReRAM chip may be in the form of an 8-pin integrated circuit (IC) chip 308.

Figure 2:
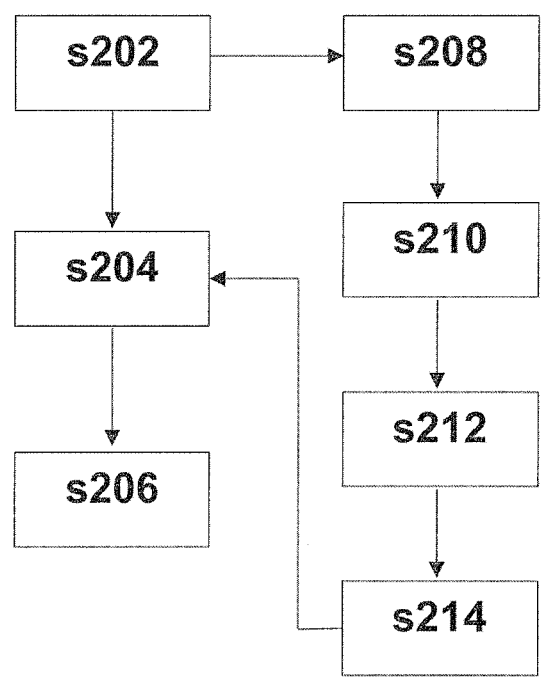
FIG. 2: illustrates a method for providing security to a network in accordance with some embodiments.
Figure 4:
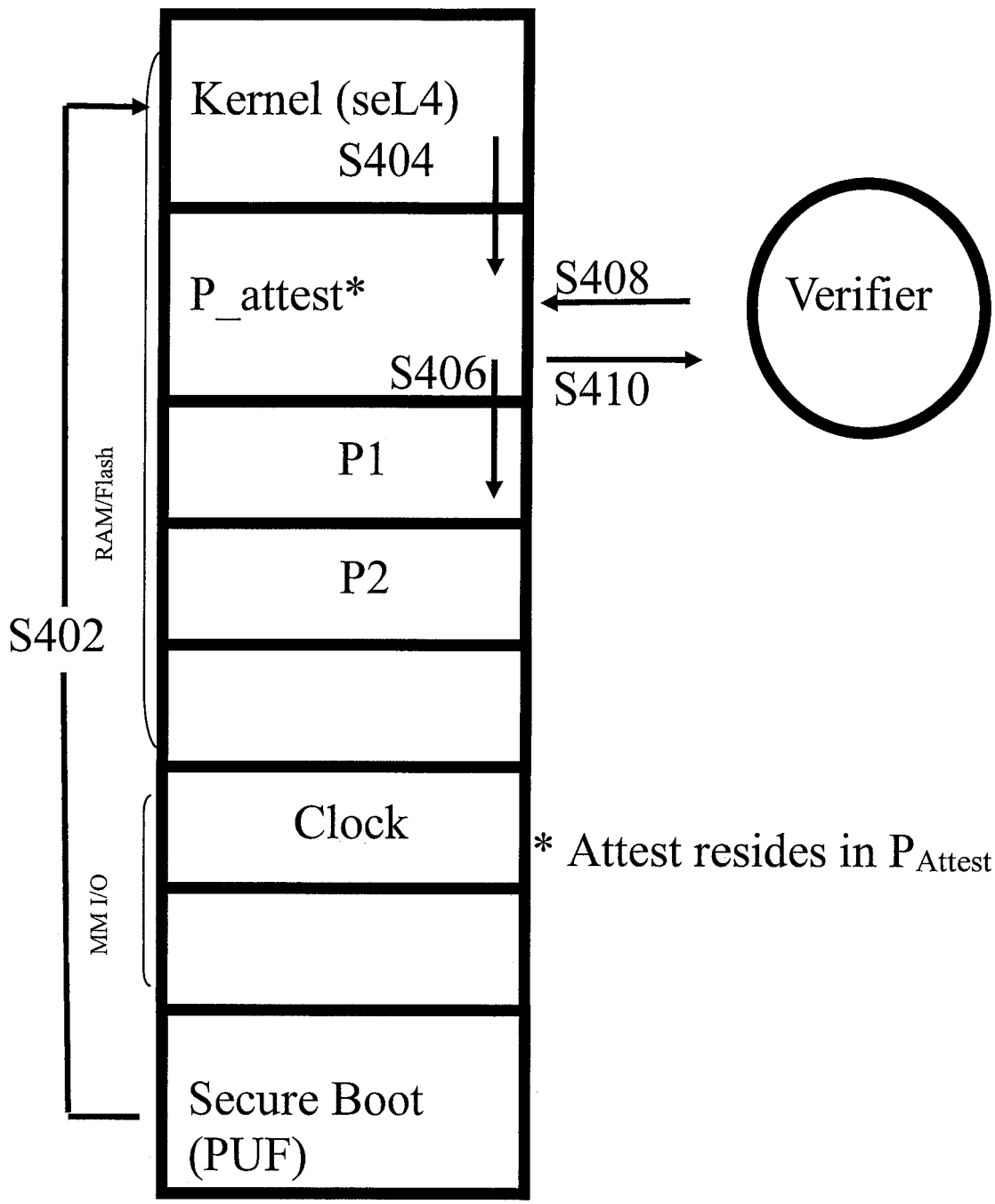
FIG. 4: illustrates a process of remote attestation in accordance with some embodiments.

Referring to FIG. 2, FIG. 3, and FIG. 4, the controller 300 may be deployed as the first node 12 and/or the second node 14 in the network 10. In some embodiments, the method of providing security to the network 10 comprises the steps of:—

(a.) generating, via a key generator 120 on the first node 12, at least one physical unclonable function (PUF); (step s202)

(b.) sending remotely, via the second node 14, an attestation request to the first node 12; (step s204) and (c.) responding to the attestation request by the first node 12 (step s206).

As part of the generation of the PUF, a public-private key pair may be generated (step s208). The private key may be generated via the PUF (step s210), and the public key may be separately generated or generated via the PUF (step s212). Once generated, the public key may be registered with the distributed ledger as an entry.

In some embodiments, the public key may include an additional step of encryption (step s214). The encryption may include one or more of the following steps:—an authenticated encryption, a signature, a symmetric encryption, an asymmetric encryption, a hash function, a key exchange, a random number generation.

It is to be appreciated that the second node 14, which is used to verify the first node 12, is remote relative to the first node 12.

FIG. 4 illustrates a process of remote attestation according with some embodiments. It is appreciable that the first node 12 and the second node 14 may have the controller 300. In the illustrative example, the first node 12 may be requesting for verification so as to join the network 10.

The process begins when the controller 300 is initialized (step s402). The initialization may be performed via a bootloader, which verifies and initiates the seL4 microkernel to launch the PUF, which may be part of an operation system or the operation system.

The seL4 microkernel then verifies and passes control to the PUF (step s404). An attestation function $P_{Attest}$ is launched to commence the remote attestation process.

As part of the attestation process, two sub-functions or sub-routines are spawned or generated, the same being $P_1$ and $P_2$. The sub-functions or sub-routines $P_1$ and/or $P_2$ may be part of the PUF generation. In some embodiments, the generation of sub-functions or sub-routines may include corresponding hash functions $H_1$, $H_2$ associated with $P_1$ and $P_2$ (step s406). In some embodiments, in addition to $P_1$ and $P_2$, one or more sub-functions or sub-routines may be generated.

Once the second node 14 detects the presence of the first node 12 in its vicinity, the remote verifier (second node) 14 operates to send an attestation request to the first node 12 via the $P_{Attest}$ function as a challenge (step s408). The $P_{Attest}$ function performs an attestation and replies to the remote verifier (step s410) via a response to the challenge. The second node 14 may detect the presence of the first node 12 via various communication methods and/or communication protocols. As an example, when the first node 12 is near the vicinity of the network 10, the first node 12 may broadcast, via Bluetooth™ or other wireless communication protocol, a request to join the network 10. The second node 14 may be configured to receive the request to join network 10 and upon receipt of the same, send the attestation request to the first node 12. Generally, the network 10 can be any communication network. A communication network can, for example, correspond to a fiber-based communication network, a free-space type communication network or a quantum-based communication network. A specific example can be a Radio Frequency (RF) based network (e.g., a Bluetooth™ based network or a wireless communication network) which can be considered to be a subset of the earlier mentioned examples of a fiber-based communication network, a free-space type communication network and/or a quantum-based communication network.

It is appreciable that in addition to a challenge-response authentication protocol, other authentication protocols may be envisaged and used.

The remote verifier 14 may be part of the distributed ledger system 16 which supports self-sovereign identities. The controller 300 of the first node 12 may communicate with the network 10 using a secured communication protocol, such as, but not limited to, Secure Sockets Layer (SSL) and/or Transport Layer Security (TLS) protocols. In some embodiments, Hyper Text Transfer Protocol Secure (HTTPS) protocol may be used.

Figure 5:
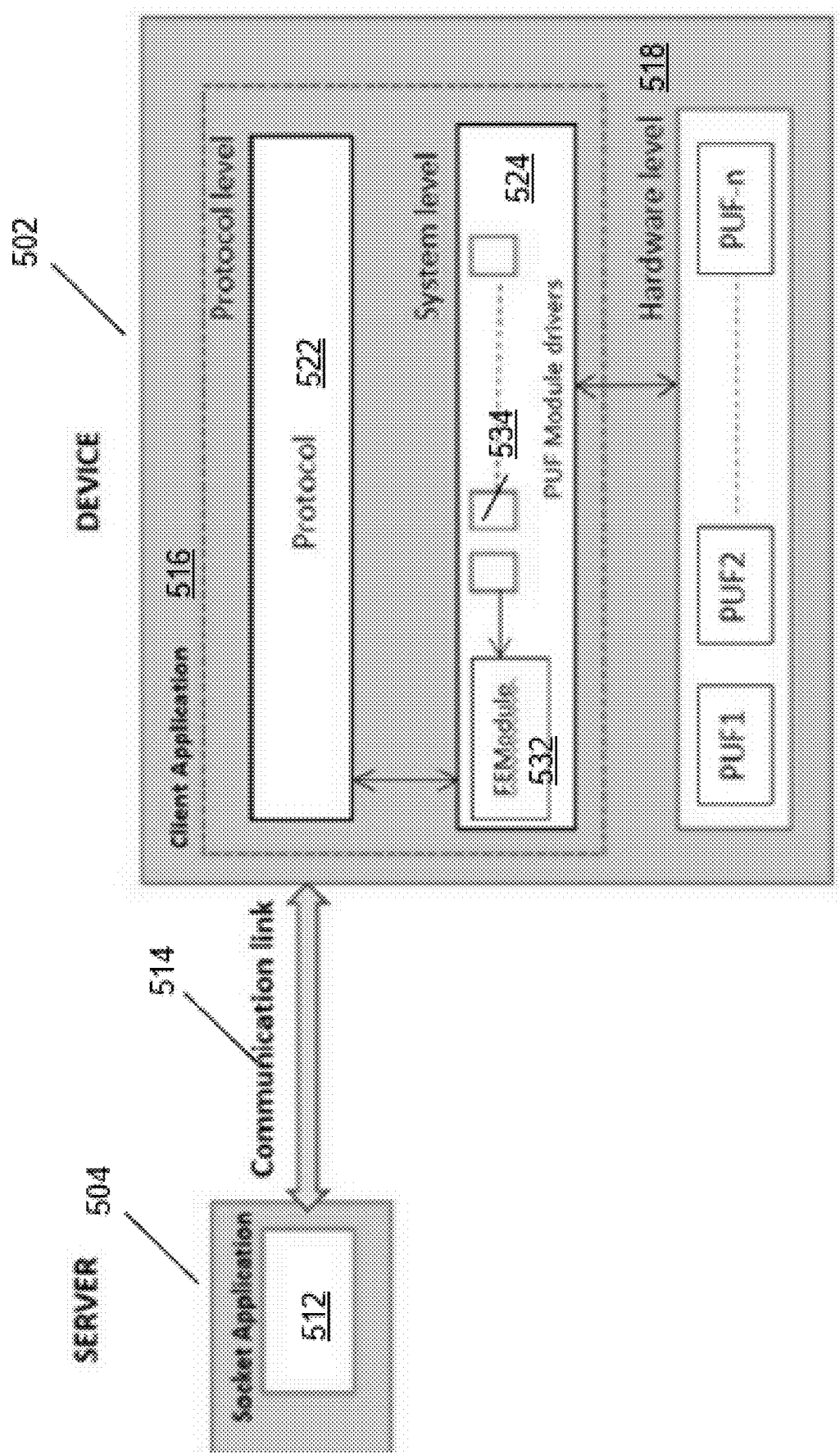
FIG. 5: shows a server-device configuration for the provision of multiple PUFs for various purposes.

FIG. 5 illustrates some embodiments where the controller 300 is capable of supporting multiple-PUF types which is illustrated in FIG. 6. Different PUFs, e.g. nanotech based ReRAM chips and optical PUF (e.g. diamonds) may be used to establish security or authentication of electronic data/entries. Other PUFs, e.g. biological fingerprint and face recognition systems may be used for the authentication of humans and other biological entities. It is appreciable that in embodiments having multiple PUF types, secure mechanism to authenticate the various PUFs may be necessary. Such secure mechanism may involve the use of apparatus such as laser cutter, detector, image capturing devices etc. It is appreciable that the device 502 may be a user device, such as, but not limited to, a mobile smart phone or a tablet PC. The server 504 shown in FIG. 5 may be a verifier device or part thereof and the device 502 may be the first node 12. The server 504 may include hardware and software components for implementation of various functions including a socket application 512 for creating a communication link 514 with the device 502. The device 502 may include a client application 516 configured to interface with a hardware level 518. The client application 516 may include a protocol level/layer 522 and a system level/layer 524. The protocol level 522 is configured to send and receive data with the server 504 via the communication link 514. The system level/layer 524 comprises a module 532 and at least one PUF module driver 534 operable to interface with at least one PUF. As described, the PUF may include at least one of the PUF type as described in FIG. 6.

Figure 7:
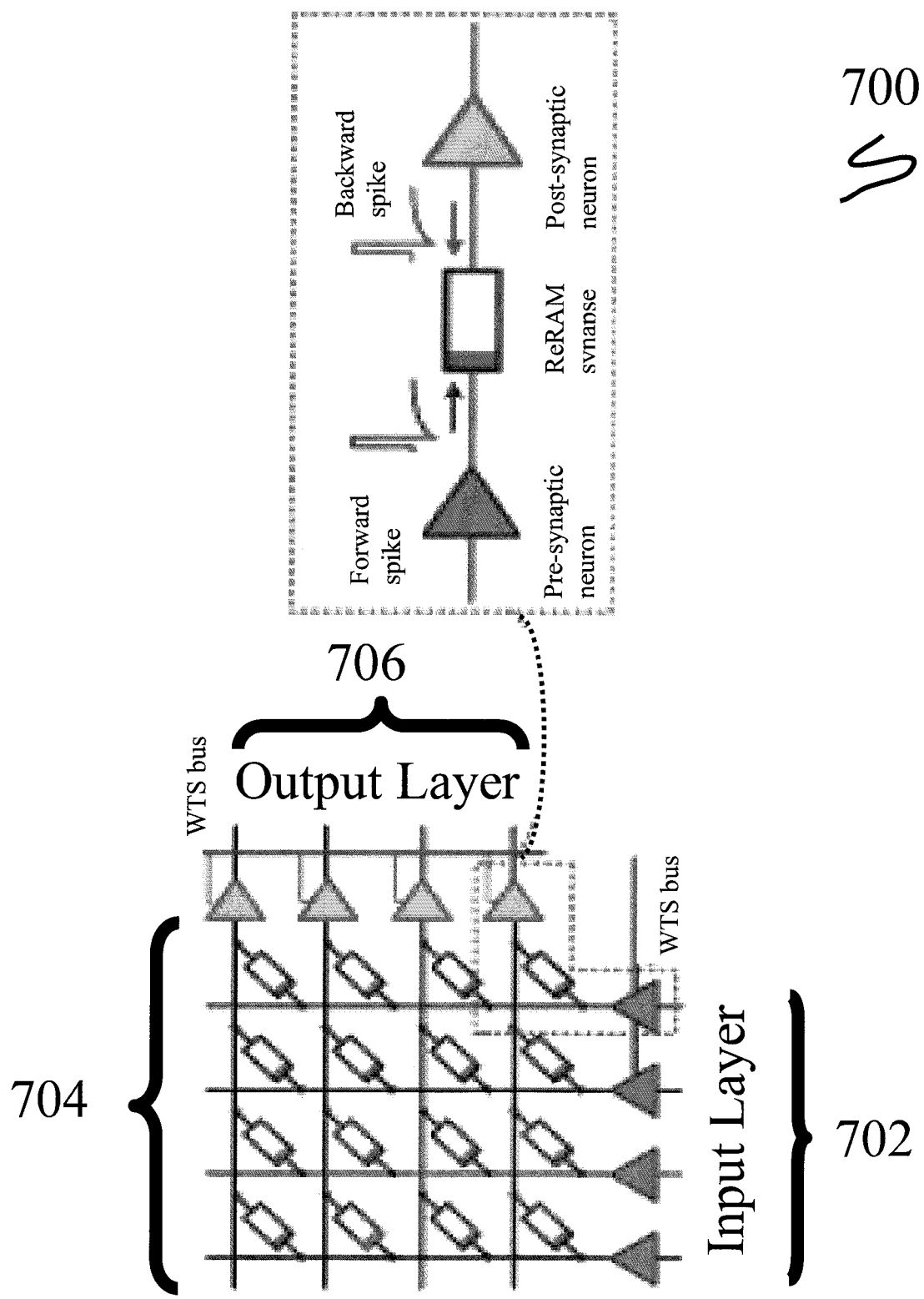
FIG. 7: shows a neuromorphic computing platform with array(s) of resistive random-access memory (ReRAM) as an embodiment of the key generator.

FIG. 7 is an exemplary neuromorphic computing platform 700 with array(s) of resistive random-access memory (ReRAM) as an embodiment of the key generator 120. The neuromorphic computing platform 700 comprises an input layer 702, a synaptic device and parallel architecture 704, and an output layer 706. Neuromorphic computing system comprises the synaptic device, neuronal circuit, and neuromorphic architecture. With the two-terminal nonvolatile nanoscale memristor as the synaptic device and crossbar as parallel architecture, the memristor provides both compute and memory functions on the same platform 700. The neuromorphic computing platform 700 of the key generator 120 may be installed with the AI system 18.

In some embodiments, the artificial intelligent (AI) system 18 comprises an AI based tool, the AI based tool operable to remove the first node 12 if the first node 12 fails the attestation request. The AI tool may include one or more neural networks for implementation of deep-learning algorithms. In some embodiments, the AI tool may include different domains of AI in increasing complexity, including, but not limited to, assisted intelligence, augmented intelligence, automated intelligence, and autonomous intelligence.

The present system accelerates the multiplication operation and its successive generalizations by parallelization. It generalizes the Dot Product Engine for matrix-vector multiplications (Hu et al., 2016) to operate on the generalized geometric product in geometric algebras.

The geometric algebra component also enables efficient reasoning in the AI system 18 about events specified by space (geography) and time (history).

Neural networks may be abstractly represented as graphs and concretely as matrices and vectors for the actual computation. For example, Bayesian neural networks are represented as directed acyclic graphs (DAGs).

In some embodiments, the AI system 18 is operable to implement Generative Adversarial Networks (GAN) for adaptive security and safety.

FIG. 8 illustrates a neural network for the recognition of handwritten numbers (digits), trained on the MNIST dataset. As an example, the neural network can be trained to recognize specific DNA sequences, delivered to the system by a genetic profiling pipeline. The capability is able to solve many counterfeit issues in the food supply chain, e.g. to identify different closely related species of mud crabs, or to detect the contamination of beef with horse meat (the latter is typically a lower cost product).

In some embodiments, the controller 300 may be a stand-alone device (i.e. not part of a network 10). It is contemplated that the stand-alone device may be utilized as a cryptography device for various information security related applications. For example, the cryptography device may be deployed in various cyber-security context or applications, such as, but not limited to, a verifier device for an autonomous vehicle, supply chain or logistic management, food source tracing. For each application, data may be received from a plurality of sensors (both hardware and software sensors) via an IoT system 20 and sent to the verifier device. Other sub-systems such as the distributed ledger system 16 and the AI system 18 may be used complement and reinforce the security.

In some embodiments, the controller 300 may be in the form of modular components such as a serial peripheral interface (SPI), Inter-Integrated Circuit (I2C), memory devices such as SD card, micro-SD card, universal serial bus (USB) devices, etc.

In some embodiments, the controller 300 (as a stand-alone device), with a secured and verified microkernel running on a verified hardware platform (e.g. SabreLite chipset board) be regarded as an IoT component, interfacing with the neuromorphic computing platform including the array of ReRAM. The neuromorphic computing platform therefore integrates the IoT sub-system, AI sub-system, in addition to the PUF generation which is suited for joining a distributed ledger or blockchain.

One or more of the described components and sub-systems may form an overall secure system for enhancing cyber-security. In particular, the overall system comprising the various sub-systems may be form to provide a comprehensive and enhanced solution for cyber-security. In some embodiments, it is also possible for the controller 300 to interact directly with the DNA, RNA, and protein sequences through pattern recognition algorithms implemented in the ReRAM chip via sequence alignment.

In particular, the IoT component (a verified microkernel running on a verified hardware platform) interfaces securely with the AI component which acts as the root of trust (PUF).

It should be appreciated by the person skilled in the art that the above disclosure is not limited to the embodiment described. It is appreciable that modifications and improvements may be made without departing from the scope of the present disclosure.

It should be further appreciated by the person skilled in the art that one or more of the above modifications or improvements, not being mutually exclusive, may be further combined to form yet further embodiments of the present disclosure.

The invention claimed is:

1. A system comprising: (a) a first node having a key generator, wherein the first node is an IOT component, a server, a laptop computer, a tablet PC, a smart phone, or a tablet PC: wherein the first node comprises an off-the-shelf packaged resistive random access memory (ReRAM) chip; and wherein the ReRAM chip provides both a neuromorphic computing function for the first node and a physical unclonable function (PUF) for the key generator; wherein the ReRAM chip is arranged in a multi-layer crossbar array format; and (b) a second node configured to remotely send an attestation request to the first node, wherein the first node is configured to respond to the attestation request as part of a verification to join the network; wherein the verification comprises using a challenge-response authentication protocol; wherein the second node is part of a distributed ledger; and wherein a public-private key pair is generated for the first node, wherein the private key is generated for the first node via the key generator, and the public key is registered with the distributed ledger.

2. The system of claim 1, wherein the public key is encrypted before registration with the distributed ledger.

3. The system of claim 2, wherein the security of the first node is verified through the remote attestation of the public key on the distributed ledger.

* * * * *